(12) United States Patent
Ji et al.

(10) Patent No.: US 12,725,421 B2
(45) Date of Patent: Sep. 1, 2026

(54) SYSTEM AND METHOD FOR OBJECT DETECTION AND TRACKING BY USING EDGE CCTV

(71) Applicant: INBIC INC., Seongnam (KR)

(72) Inventors: Hyo Chul Ji, Seongnam (KR); Hee Am Seo, Paju (KR)

(73) Assignee: INBIC INC., Seongnam (KR)

( * ) Notice: Subject to any disclaimer, the term of this patent is extended or adjusted under 35 U.S.C. 154(b) by 130 days.

(21) Appl. No.: 18/874,622

(22) PCT Filed: May 8, 2023

(86) PCT No.: PCT/KR2023/006208
§ 371 (c)(1),
(2) Date: Dec. 13, 2024

(87) PCT Pub. No.: WO2024/048901
PCT Pub. Date: Mar. 7, 2024

(65) Prior Publication Data

US 2026/0253419 A1 Aug. 27, 2026

(30) Foreign Application Priority Data

Sep. 1, 2022 (KR) ........................ 10-2022-0110703

(51) Int. Cl.
*H04N 7/18* (2006.01)
*G06T 7/20* (2017.01)
(Continued)

(52) U.S. Cl.
CPC ................ *G06V 20/52* (2022.01); *G06T 7/20* (2013.01); *G06V 20/44* (2022.01); *H04N 7/188* (2013.01);
(Continued)

(58) Field of Classification Search
CPC .... G06V 20/52; G06V 20/44; G06V 2201/07; G06T 7/20; G06T 2207/30241; H04N 7/18; H04N 7/188; H04N 7/181
(Continued)

(56) References Cited

U.S. PATENT DOCUMENTS 11,710,392 B2 * 7/2023 San Pedro ............... H04N 7/18 348/143
2024/0340529 A1 * 10/2024 Yamaguchi ............ G06V 20/52

FOREIGN PATENT DOCUMENTS

CN 111836009 A 10/2020
JP 2016-127563 A 7/2016
(Continued)

*Primary Examiner* — Sherrie Hsia
(74) *Attorney, Agent, or Firm* — Harvest IP Law, LLP

(57) ABSTRACT

The present invention relates to a system and a method for object detection and tracking by using an edge CCTV, the system and method determining whether an object is identical and tracking same by collectively considering target object characteristics having a relatively small amount of data which is processable according to the specifications of an edge CCTV, wherein, if suspect objects are detected by multiple CCTVs, a control server determines one target object through precise analysis, and tracks the target object while reflecting a changed feature thereof. The present invention may comprise a CCTV node including a camera, a transceiver, and an edge processor, and a control server including a determination module and a tracking module.

14 Claims, 8 Drawing Sheets

(51) Int. Cl.
*G06V 20/40* (2022.01)
*G06V 20/52* (2022.01)

(52) U.S. Cl.
CPC ............... *G06T 2207/30241* (2013.01); *G06V 2201/07* (2022.01)

(58) Field of Classification Search
USPC ................. 348/143, 151–155, 159; 340/541; 382/103
See application file for complete search history.

(56) References Cited

FOREIGN PATENT DOCUMENTS

| | | | |
|---|---|---|---|
| KR | 1020050096484 | A | 10/2005 |
| KR | 1020090116215 | A | 11/2009 |
| KR | 1020180075506 | A | 7/2018 |
| WO | 2020195376 | A1 | 10/2020 |

* cited by examiner

【FIG.1】
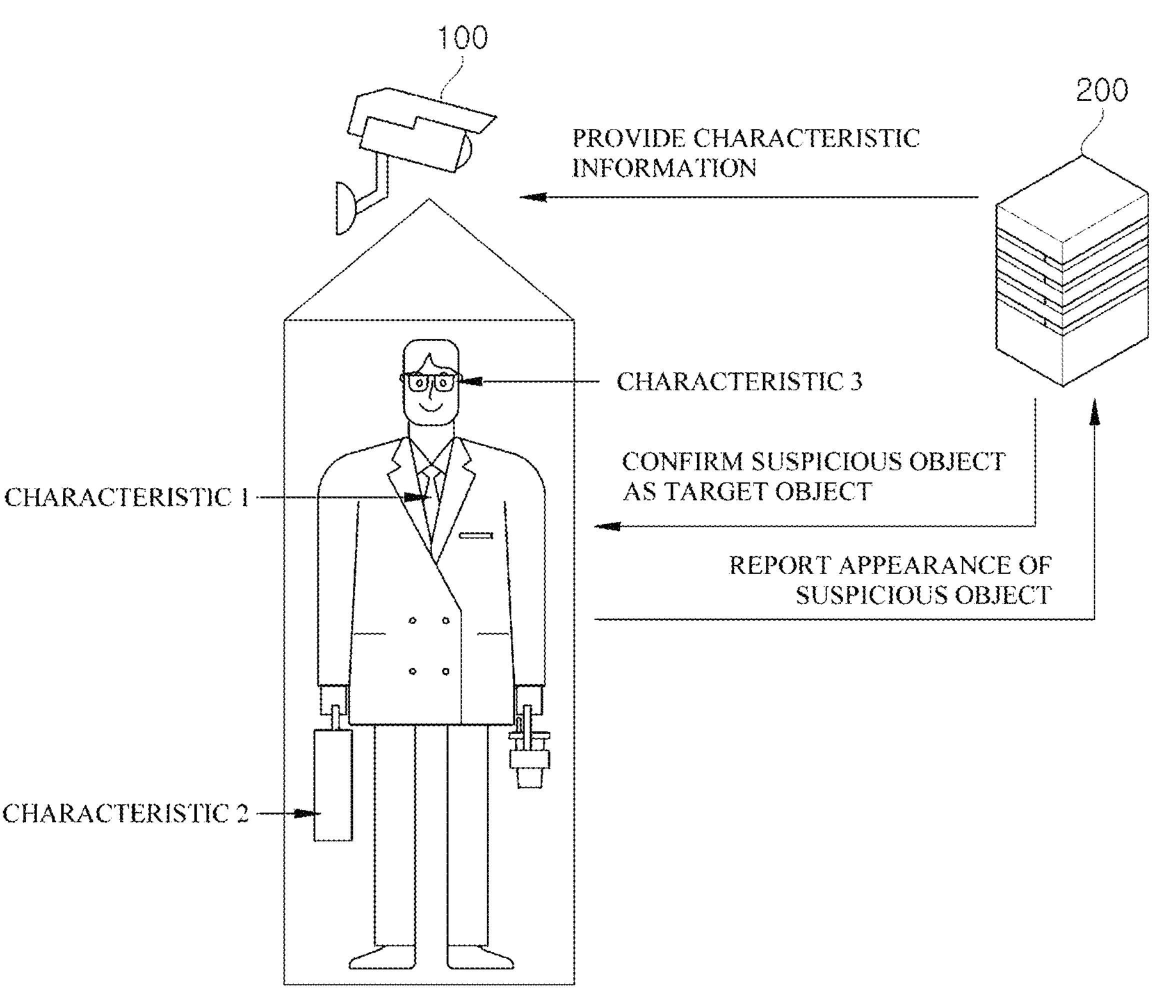

【FIG.2】
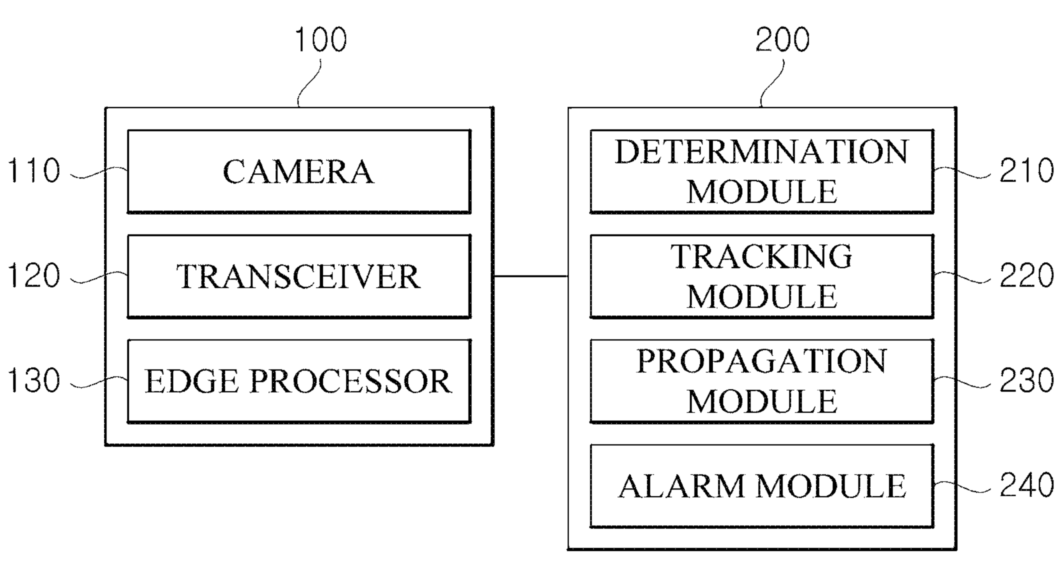

【FIG.3】
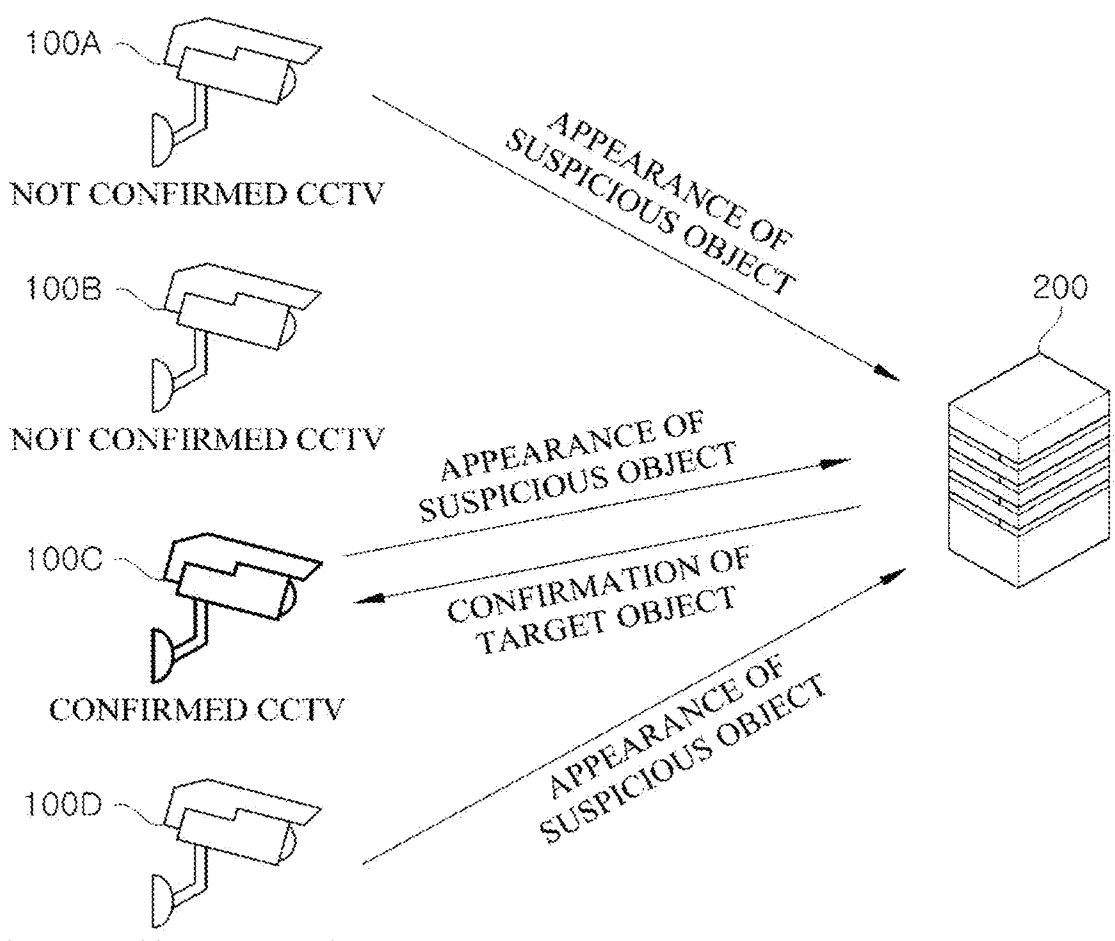

【FIG.4】
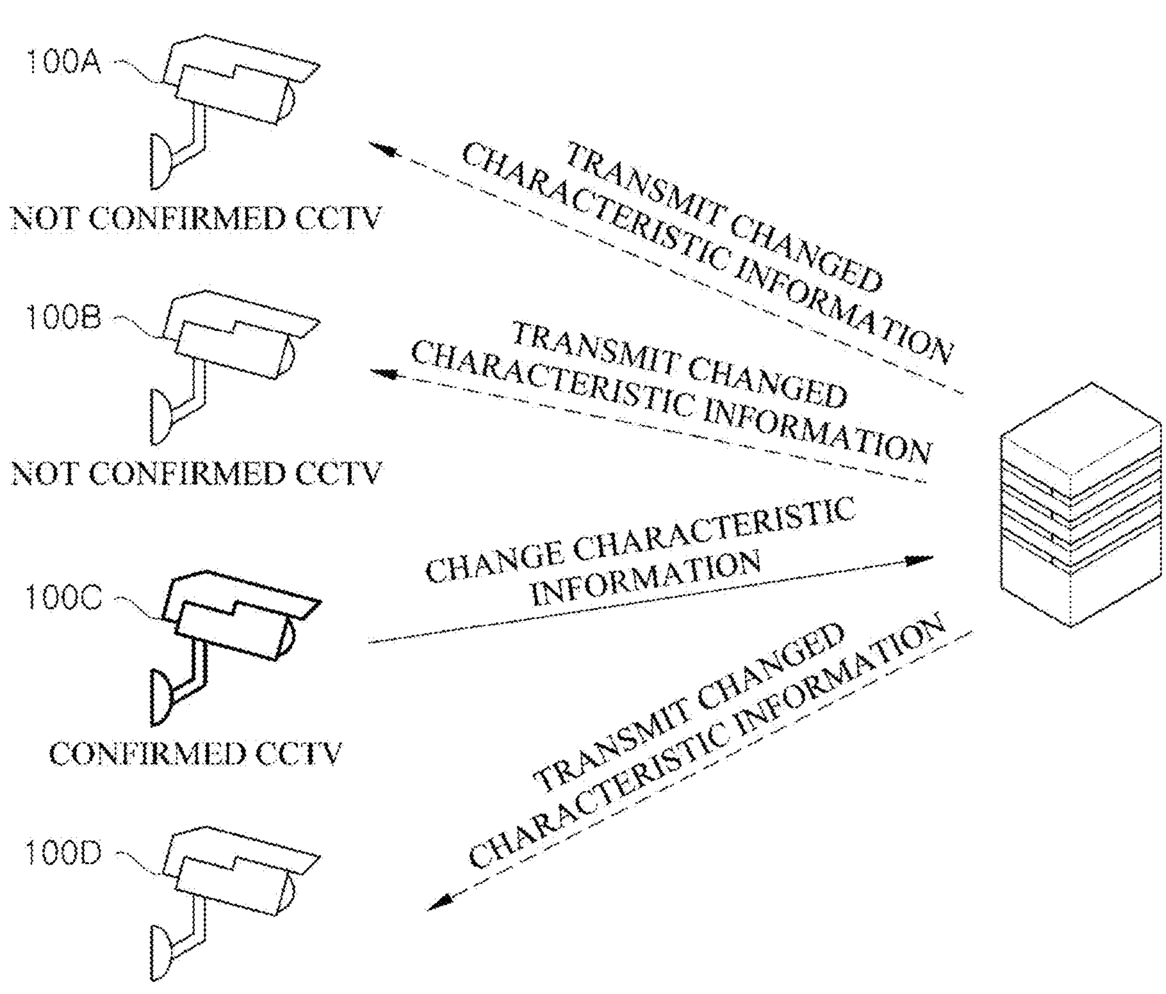

【FIG.5】
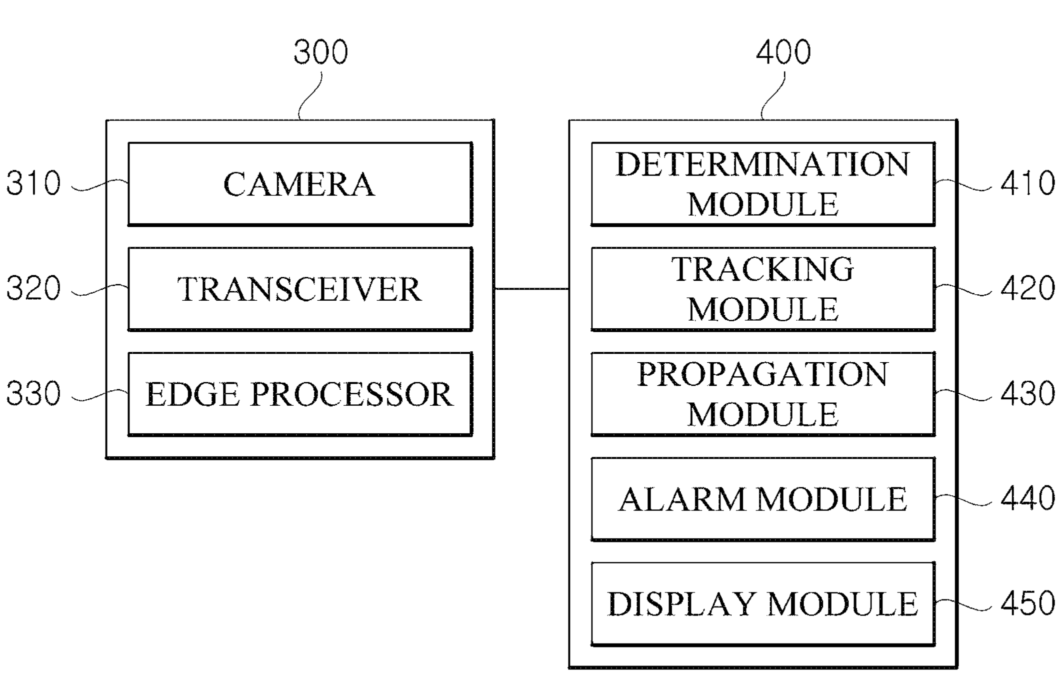

【FIG.6】
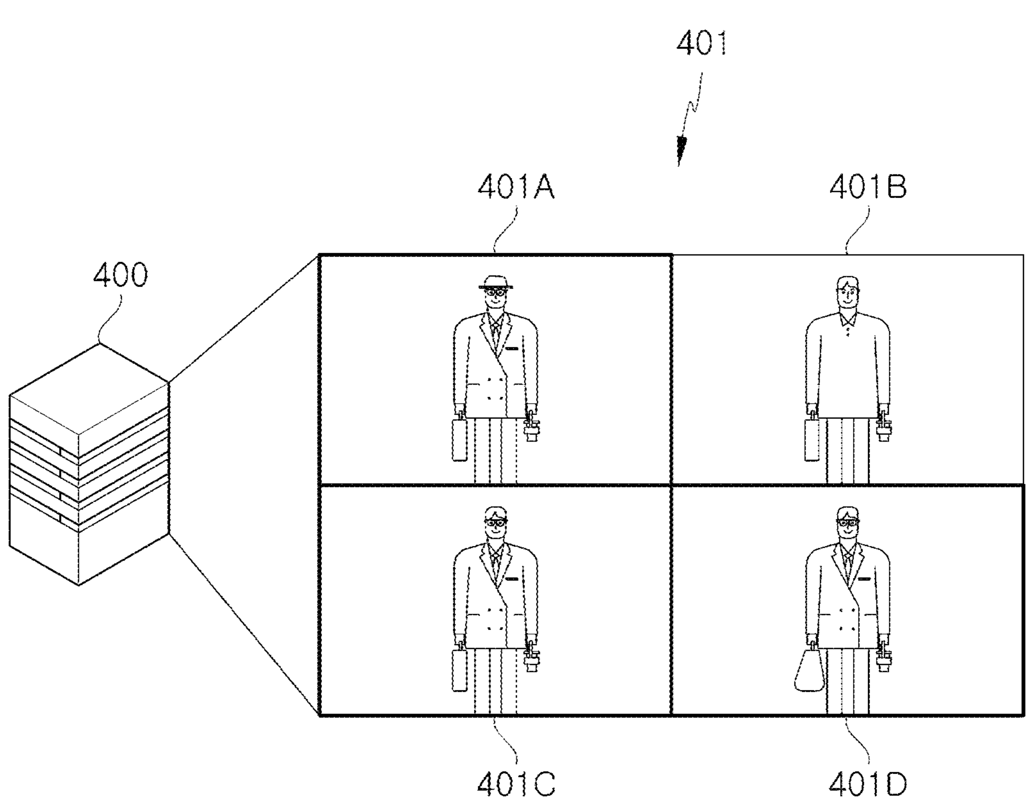

【FIG. 7】
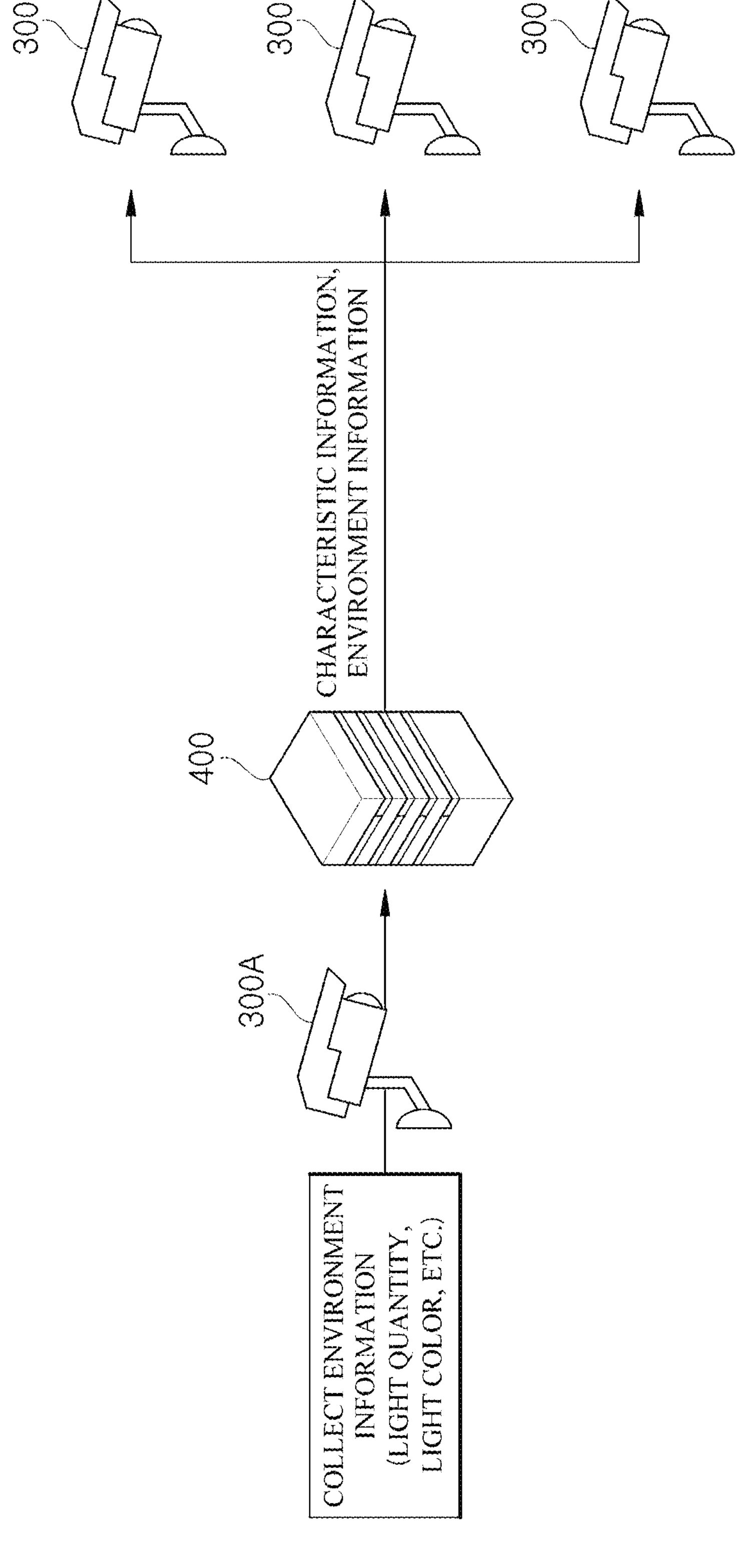

【FIG. 8】
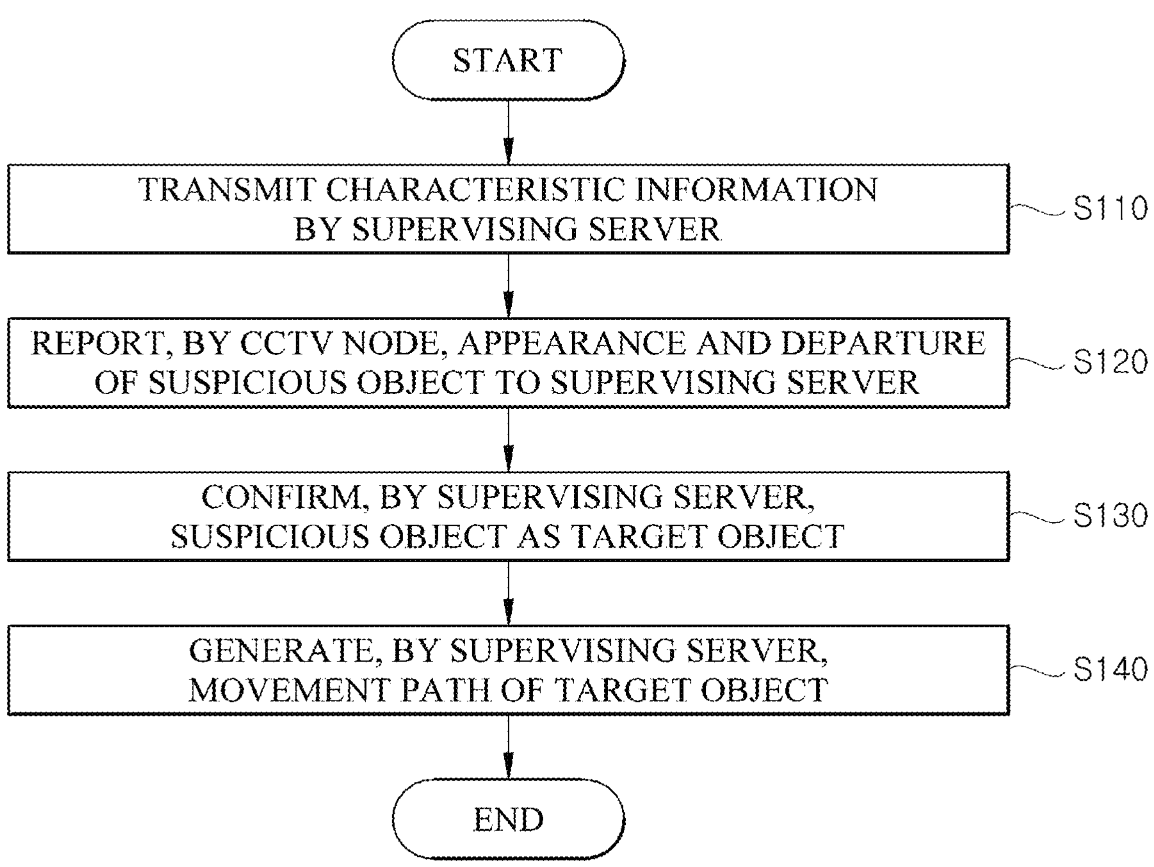

SYSTEM AND METHOD FOR OBJECT DETECTION AND TRACKING BY USING EDGE CCTV

CROSS REFERENCE TO RELATED APPLICATION(S)

This application is a National Stage of International Application No. PCT/KR2023/006208 filed on May 8, 2023, claiming priority based on Korean Patent Application No. 10-2022-0110703 filed on Sep. 1, 2022, the disclosures of which is incorporated herein by reference in their entirety.

TECHNICAL FIELD

The present invention relates to a technology for detecting and tracking an object using an edge CCTV, and more particularly to a system and method for detecting and tracking an object using an edge CCTV in which an identity of an object is determined and tracked by collectively considering characteristics of a target object having a relatively small amount of data processible according to the specifications of the edge CCTV, a supervising server confirms any one target object through precise analysis when a suspicious object is detected by a plurality of CCTVs, and the target object is tracked by factoring changed characteristics of the target object.

BACKGROUND ART

A CCTV captures video for a specific purpose and provides the video to specific people, and is typically installed for safety reasons such as crime prevention, surveillance, and fire prevention. CCTVs may be installed in a place such as a downtown where many people pass by, in a crime-prone area, inside and outside a building, in an elevator or a subway, etc. to detect situations there.

Meanwhile, in an environment where two or more CCTVs are installed, when it is possible to detect which CCTVs sequentially display the same object (person of interest, person of low security clearance, lost child, lost pet dog, etc.), a movement path of the object may be tracked.

Conventionally, when an object detected on CCTV1 disappears from a screen and then appears on CCTV2, there has been a problem in that it is difficult to automatically determine an identity of the object detected on CCTV1 and the object on CCTV2.

In particular, since CCTVs are usually installed at points much higher than a height of a person, such as on utility poles or ceiling corners, a face, etc. should be captured from an angle at which the face is obliquely viewed from above rather than a front allowing facial features to be easily identified, and thus it is difficult to quickly capture and identify characteristic elements of an object due to an image having limited information.

Korean Patent Publication No. 2005-0096484 discloses a method of identifying a face of a person in video acquired using a camera and determining whether the face is covered by sunglasses or a mask. However, the conventional technology has a disadvantage in that reliability of detection of a subject deteriorates since the face cannot be recognized when a CCTV is installed at a point much higher than a height of a person, such as a utility pole or ceiling corner.

DISCLOSURE

Technical Problem

A task to be solved by the present invention is to provide a system and method for detecting and tracking an object using an edge CCTV in which an identity of an object is determined and tracked by collectively considering characteristics of a target object having a relatively small amount of data processible according to the specifications of the edge CCTV, a supervising server confirms any one target object through precise analysis when a suspicious object is detected by a plurality of CCTVs, and the target object is tracked by factoring changed characteristics of the target object.

Technical Solution

A system for detecting and tracking an object using an edge CCTV according to an embodiment of the present invention includes a plurality of CCTV nodes each including a camera, a transceiver configured to continuously transmit video captured by the camera to a supervising server and receive characteristic information for detecting a target object from the supervising server, and an edge processor configured to analyze the captured video based on the received characteristic information, report appearance of a suspicious object to the supervising server when the suspicious object is detected, and report departure of the suspicious object to the supervising server when the suspicious object disappears after reporting the appearance of the suspicious object, and a supervising server including a determination module configured to confirm the suspicious object as the target object or determine the suspicious object as a detection error based on video having the suspicious object whose appearance is reported, and a tracking module configured to generate a movement path of the target object based on CCTV nodes each reporting appearance and departure of the target object.

The characteristic information may include at least three of a top color, a bottom color, a hair length, a height, wearing a hat, wearing a tie, wearing glasses, wearing a mask, or carrying bag, and when a detected object corresponds to a preset number or more of pieces of the characteristic information, the edge processor of the CCTV node may consider the object as a suspicious object.

The supervising server may further include a propagation module configured to report appearance of the target object to other CCTV nodes around a CCTV node reporting the target object when the determination module confirms the suspicious object as the target object, and when the detected object corresponds at least three pieces of the characteristic information, and propagation of appearance of the target object in a surrounding CCTV node is received from the supervising server, the edge processor of the CCTV node may determine the object as a detection error.

When a suspicious object is confirmed as the target object, the determination module of the supervising server may further report confirmation of the target object to a CCTV node reporting the target object, upon occurrence of a change in characteristic information among at least one of putting on or taking off glasses, putting on or taking off a hat, changing a color of a top due to taking off clothes, or removing a bag of the target object being tracked, the edge processor of the CCTV node receiving report of confirmation of the target object may further report the changed characteristic information to the determination module of the supervising server, and the propagation module of the supervising server may propagate the reported changed characteristic information to nodes around the CCTV node reporting the change.

The supervising server may further include a display module configured to output videos transmitted from the CCTV nodes to a display device divided into a plurality of areas in real time, display all videos in which suspicious objects are reported by switching from a common mode to an attention mode, and then switch videos determined to have objects of detection errors to the common mode again.

The supervising server may further include an alarm module configured to compare the movement path of the target object with a digital map, and to notify the display module so that video including the target object is displayed in a warning mode or transmit a warning message to a preset administrator terminal when the target object approaches a preset security zone or dangerous zone.

The CCTV node may further provide capturing environment information including an illuminance value of light in a capturing range and a color value of light of surrounding streetlights to surrounding CCTV nodes via the supervising server, and when the target object departs from the CCTV node capturing the target object, each of the surrounding CCTV nodes may detect the suspicious object in corrected video factoring the capturing environment information.

A method according to a second embodiment of the present invention includes transmitting, by a supervising server, characteristic information of a target object to a plurality of CCTV nodes, receiving, by a transceiver of each of the CCTV nodes, characteristic information for detecting the target object from the supervising server, analyzing, by an edge processor of the CCTV node, captured video based on the received characteristic information to report appearance and departure of a suspicious object to the supervising server when the suspicious object is detected, receiving, by a determination module of the supervising server, a report of the appearance of the object and video in which the suspicious object is detected from the CCTV node, analyzing the video, and confirming the suspicious object as the target object, and generating, by a tracking module of the supervising server, a movement path of the target object based on CCTV nodes reporting appearance and departure of the target object.

The characteristic information may include at least three of a top color, a bottom color, a hair length, a height, wearing a hat, wearing a tie, wearing glasses, wearing a mask, or carrying bag, and when a detected object corresponds to a preset number or more of pieces of the characteristic information, the edge processor of the CCTV node may consider the object as a suspicious object.

The supervising server may further include a propagation module configured to report appearance of the target object to other CCTV nodes around a CCTV node reporting the target object when the determination module confirms the suspicious object as the target object, and when the detected object corresponds at least three pieces of the characteristic information, and propagation of appearance of the target object in a surrounding CCTV node is received from the supervising server, the edge processor of the CCTV node may determine the object as a detection error.

When a suspicious object is confirmed as the target object, the determination module of the supervising server may further report confirmation of the target object to a CCTV node reporting the target object, upon occurrence of a change in characteristic information among at least one of putting on or taking off glasses, putting on or taking off a hat, changing a color of a top due to taking off clothes, or removing a bag of the target object being tracked, the edge processor of the CCTV node receiving report of confirmation of the target object may further report the changed characteristic information to the determination module of the supervising server, and the propagation module of the supervising server may propagate the reported changed characteristic information to nodes around the CCTV node reporting the change.

The supervising server may further include a display module configured to output videos transmitted from the CCTV nodes to a display device divided into a plurality of areas in real time, display all videos in which suspicious objects are reported by switching from a common mode to an attention mode, and then switch videos determined to have objects of detection errors to the common mode again.

The supervising server may further include an alarm module configured to compare the movement path of the target object with a digital map, and to notify the display module so that video including the target object is displayed in a warning mode or transmit a warning message to a preset administrator terminal when the target object approaches a preset security zone or dangerous zone.

The CCTV node may further provide capturing environment information including an illuminance value of light in a capturing range and a color value of light of surrounding streetlights to surrounding CCTV nodes via the supervising server, and when the target object departs from the CCTV node capturing the target object, each of the surrounding CCTV nodes may detect the suspicious object in corrected video factoring the capturing environment information.

Advantageous Effects

According to embodiments of the present invention, an identity of an object may be determined and tracked by collectively considering characteristics of a target object having a relatively small amount of data processible according to the specifications of an edge CCTV, a supervising server may confirm any one target object through precise analysis when a suspicious object is detected by a plurality of CCTVs, and the target object may be tracked by factoring changed characteristics of the target object.

DESCRIPTION OF DRAWINGS

FIG. 1 is a schematic diagram illustrating a system for detecting and tracking an object using an edge CCTV according to a first embodiment of the present invention;

FIG. 2 is a block diagram illustrating a configuration of a CCTV node and a supervising server illustrated in FIG. 1;

FIG. 3 is a schematic diagram illustrating a method of confirming a target object between the supervising server illustrated in FIG. 1 and a plurality of CCTV nodes;

FIG. 4 is a schematic diagram illustrating a case where a changed characteristic of the target object is propagated to other CCTV nodes;

FIG. 5 is a block diagram illustrating a system for detecting and tracking an object using an edge CCTV according to a second embodiment of the present invention;

FIG. 6 is a schematic diagram illustrating a method of outputting video transmitted to CCTV nodes;

FIG. 7 is a diagram illustrating a method of detecting an object based on capturing environment information by a plurality of CCTV nodes in the second embodiment; and FIG. 8 is a flowchart illustrating a method of detecting and tracking the object using the edge CCTV according to a third embodiment of the present invention.

BEST MODE

Hereinafter, several embodiments of the present invention will be described in detail using drawings. However, this is not intended to limit the present invention to any specific embodiment, and it should be understood that all transformations, equivalents, and substitutions including the technical idea of the present invention are within in the scope of the present invention.

In this specification, singular expressions include plural expressions unless the context clearly indicates otherwise.

In this specification, when a component is described as "having" or "comprising" a sub-component, this means that another component may be included, rather than excluding the other component, unless specifically stated otherwise.

In this specification, each of the terms " . . . unit", " . . . module", and " . . . component" refers to a unit that processes at least one function or operation, and may be implemented by hardware, software, or a combination of hardware and software.

First Embodiment

FIG. 1 is a schematic diagram illustrating a system for detecting and tracking an object using an edge CCTV according to a first embodiment of the present invention.

In the first embodiment, a CCTV node 100 that captures a pre-designated area receives characteristic information on a target object (a specific person) from a supervising server 200, and analyzes captured video. When an object matching the characteristic information is detected, the CCTV node 100 designates the object as a suspicious object and reports the suspicious object to the supervising server 200. For reference, in this embodiment, the target object is defined and described as a specific person, but may be defined as a companion animal such as a pet dog or cat.

The supervising server 200 precisely analyzes the video of the CCTV node 100 in which the suspicious object is detected to finally determine whether the suspicious object is a target object, and tracks a movement path of the target object based on the video of the CCTV node 100 in which the target object is captured. When the target object approaches a security zone or a dangerous zone, the supervising server 200 may warn an administrator.

FIG. 2 is a block diagram illustrating a configuration of the CCTV node 100 and the supervising server 200 illustrated in FIG. 1.

As illustrated in FIG. 1 and FIG. 2, the CCTV node 100 includes a camera 110, a transceiver 120, and an edge processor 130, and the supervising server 200 includes a determination module 210 and a tracking module 220. In addition, the supervising server 200 may further include a propagation module 230 and an alarm module 240.

A plurality of CCTV nodes 100 is installed in predetermined areas to have different capturing ranges.

The camera 110 of the CCTV node 100 may basically capture RGB video, and may capture infrared video at night or in low-light environments.

The transceiver 120 of the CCTV node 100 communicates with the supervising server 200. The transceiver 120 continuously transmits video captured by the camera 110 to the supervising server 200. The transceiver 120 of the CCTV node 100 may communicate with the supervising server 200 through wide-area communication such as low-power wide-area (LPWA) communication. In particular, the transceiver 120 of the CCTV node 100 may communicate with the supervising server 200 using a mobile communication protocol such as 2G, 3G, 4G, or 5G or a mobile communication protocol such as WiBro (Wireless broadband), WiMAX (World Interoperability for Microwave Access), or HSDPA (High Speed Downlink Packet Access). A communication scheme between the transceiver 120 of the CCTV node 100 and the supervising server 200 is not limited to one.

The transceiver 120 receives characteristic information for detecting a target object (specific person) from the supervising server 200.

The characteristic information for detecting the target object may include clothing worn by the target object such as a type of top (for example, long sleeves or short sleeves), a type of bottoms (for example, long pants or shorts), a color of the top, and a color of the bottoms, and may be a hair length or a height of the target object, whether the target object is wearing a hat, a tie, glasses, or a mask, or a type (shape) or a color of a bag carried by the target object. For reference, referring to the height of the target object, it is possible to distinguish between an adult or a child using a height estimated from the captured video.

The transceiver 120 may receive a photographic image or a video image for the target object in which characteristic information for detecting the target object is displayed. For reference, display of the characteristic information in the photographic image or the video image may be directly marked by the administrator or identified by an object detection algorithm (for example, R-CNN, YOLO algorithm, etc.). The photographic image or the video image of the target object may be a scene selected by the administrator from video captured by any one of the CCTV nodes 100.

The edge processor 130 of the CCTV node 100 analyzes the video being captured in real time based on the characteristic information received from the supervising server 200 to detect a suspicious object (suspect person). For example, the edge processor 130 considers an object that satisfies a predetermined number (for example, at least 3) of pieces of characteristic information listed above as the suspicious object. The edge processor 130 may use an object detection algorithm (for example, R-CNN, YOLO algorithm, etc.).

When the suspicious object is detected, the edge processor 130 reports appearance of the suspicious object to the supervising server 200. For example, when the edge processor 130 reports the appearance of the suspicious object to the supervising server 200, the transceiver 120 may transmit an object detection time in the edge processor 130 to the supervising server 200. In addition, the transceiver 120 may edit video captured from a predetermined time before a point in time when the suspicious object is detected and transmit the edited video to the supervising server 200.

When a suspicious object previously recognized within a capturing range or a target object confirmed by the supervising server 200 disappears, the edge processor 130 may report departure of the suspicious object to the supervising server 200, thereby requesting attention from the administrator.

The supervising server 200 confirms the suspicious object as a target object or determines the suspicious object as a detection error in the video transmitted from the CCTV node 100, and generates and tracks a movement path of the target object when the suspicious object is confirmed as a target object.

The determination module 210 and the tracking module 220 of the supervising server 200 will be described with reference to FIG. 3.

FIG. 3 is a schematic diagram illustrating a method of confirming a target object between the supervising server 200 illustrated in FIG. 1 and the plurality of CCTV nodes 100.

As illustrated in FIGS. 1 to 3, the determination module 210 of the supervising server 200 receives reports of detected suspicious objects from respective CCTV nodes 100A, 100B, 100C, and 100D capturing a predetermined area. For example, when there is only one target object, but objects dressed in clothing, having a height, wearing a hat, wearing a tie, wearing glasses, wearing a mask, and carrying a bag similar to those of the target object appear, suspicious objects may be detected from several CCTV nodes 100A, 100B, 100C, and 100D.

The supervising server 200 receives all videos of suspicious objects from the plurality of CCTV nodes 100A, 100B, 100C, and 100D detecting the suspicious objects.

The determination module 210 of the supervising server 200 analyzes each of the captured videos received from the plurality of CCTV nodes 100A, 100B, 100C, and 100D and confirms a suspicious object in video captured by any one of the CCTV nodes as the target object. For example, in FIG. 3, the determination module 210 confirms a suspicious object detected by the third CCTV node 100C as the target object.

The determination module 210 determines, as detection errors, suspicious objects detected by other nodes, that is, the first CCTV node 100A, the second CCTV node 100B, and the fourth CCTV node 100D, other than the suspicious object determined as the target object. For reference, the determination module 210 may select the target object by the administrator checking the videos captured by the plurality of CCTV nodes 100 in which the suspicious objects are detected. In addition, the determination module 210 may precisely analyze the videos captured by the plurality of CCTV nodes 100A, 100B, 100C, and 100D in which the suspicious objects are detected, compare images of the target object and the suspicious objects, and confirm the target object.

Upon confirming the suspicious object detected by the third CCTV node 100C as the target object, the determination module 210 transmits the suspicious object to the third CCTV node 100C.

When the target object being captured by the third CCTV node 100C disappears from a capturing range of the third CCTV node 100C, the determination module 210 receives a report of object departure from the third CCTV node 100C.

Upon receiving the report of object departure from the third CCTV node 100C, the determination module 210 receives all videos in which the suspicious objects are captured from the first CCTV node 100A to the fourth CCTV node 100D again, and searches for the departing target object. The determination module 210 analyzes each of the received captured videos and confirms a suspicious object in video captured by any one of the CCTV nodes 100A, 100B, 100C, and 100D as the target object.

The tracking module 220 generates a movement path of the target object based on the CCTV nodes 100 reporting appearance and departure of the target object. The tracking module 220 may display the movement path of the target object on a digital map.

Meanwhile, when any one of the suspicious objects detected by the plurality of CCTV nodes 100 is determined as the target object by the determination module 210, the propagation module 230 of the supervising server 200 reports appearance of the target object in the third CCTV node 100C to other CCTV nodes around the third CCTV node 100C in which the target object is confirmed, that is, the first CCTV node 100A, the second CCTV node 100B, and the fourth CCTV node 100D.

The first CCTV node 100A, the second CCTV node 100B, and the fourth CCTV node 100D, which have been notified of the appearance of the target object from the third CCTV node 100C, determine the detected suspicious objects as detection errors even when the suspicious object is detected before the third CCTV node 100C reports the departure of the target object to the supervising server 200. Alternatively, the first CCTV node 100A, the second CCTV node 100B, and the fourth CCTV node 100D do not detect the suspicious objects until the third CCTV node 100C reports the departure of the target object to the supervising server 200.

When the departure of the target object is reported to the supervising server 200 from the third CCTV node 100C in which the target object is confirmed, the first CCTV node 100A, the second CCTV node 100B, and the fourth CCTV node 100D detect the suspicious objects, and the suspicious objects are detected, the appearance of the suspicious objects is reported to the supervising server 200.

FIG. 4 is a schematic diagram illustrating a case where a changed characteristic of the target object is propagated to other CCTV nodes 100.

As illustrated in FIGS. 1, 2, and 4, when the determination module 210 of the supervising server 200 confirms a suspicious object detected by one CCTV node (for example, the third CCTV node 100C) as the target object, the third CCTV node 100C continuously tracks and captures the confirmed target object.

The edge processor 130 of the third CCTV node 100C that tracks and captures the target object further detects a change in characteristic information of the target object being tracked (captured) among at least one of putting on or taking off glasses, putting on or taking off a hat, changing a color of a top due to taking off clothes, or removing a bag.

When a change occurs in characteristic information of the target object being tracked, the third CCTV node 100C reports the changed characteristic information to the determination module 210 of the supervising server 200.

The determination module 210 of the supervising server 200 receiving the changed characteristic information from the third CCTV node 100C propagates the changed characteristic information to CCTV nodes around the third CCTV node 100C, that is, the first CCTV node 100A, the third CCTV node 100C, and the fourth CCTV node 100D.

Thereafter, when the departure of the target object is reported to the supervising server 200 from the third CCTV node 100C, the first CCTV node 100A, the second CCTV node 100B, and the fourth CCTV node 100D start to detect suspicious objects, and detect the suspicious objects by factoring the characteristic information changed by the third CCTV node 100C propagated from the supervising server 200.

The alarm module 240 compares the movement path of the target object generated by the tracking module 220 with the digital map, and transmits a warning message to a preset administrator terminal when the target object approaches a preset security zone or dangerous zone.

MODE FOR INVENTION

Second Embodiment

FIG. 5 is a block diagram illustrating a system for detecting and tracking an object using an edge CCTV according to a second embodiment of the present invention, and FIG. 6 is a schematic diagram illustrating a method of outputting video transmitted to CCTV nodes 300.

A camera 310, a transceiver 320, and an edge processor 330 of each of the CCTV nodes 300 of the second embodiment are the same as those of the first embodiment, and thus redundant descriptions are omitted. In addition, a determination module 410, a tracking module 420, a propagation module 430, and an alarm module 440 of a supervising server 400 are the same as those of the first embodiment, and thus redundant descriptions are omitted and a display module will be described.

For reference, the CCTV nodes 300 are defined and described as a first CCTV node 300A to a fourth CCTV node 300D for convenience of description (see reference symbols of FIG. 7).

As illustrated in FIGS. 5 and 6, the display module 450 outputs videos transmitted from the CCTV nodes, that is, the first CCTV node 300A to the fourth CCTV node 300D, in real time to divided screens 401A, 401B, 401C, and 401D of a display device 401. For reference, the display device 401 may be divided in proportion to the number of CCTV nodes 300. An angle of a person captured on the display device 401 is illustrated as a frontal angle for convenience of description. However, in practice, the CCTV nodes are installed at a position higher than a height of a person, and thus a capturing angle may change.

The display module 450 may output videos transmitted from the first CCTV node 300A to the fourth CCTV node 300D through the divided screens 401A, 401B, 401C, and 401D of the display device 401 selectively in a common mode or an attention mode.

For example, the display module 450 may sequentially arrange and output captured videos of the first CCTV node 300A to the fourth CCTV node 300D on the first screen 401A to the fourth screen 401D, switch the screens 401A, 401C, and 401D, on which captured videos are being output, of the CCTV nodes where the suspicious objects are reported, for example, the first CCTV node 300A, the third CCTV node 300C, and the fourth CCTV node 300D, to the attention mode, and output the videos. The second CCTV node 300B, where a suspicious object is not reported, outputs video to the screen 401B in the normal mode.

Upon outputting videos to the display device 401 in the attention mode, the display module 450 may output the videos by causing borders of the assigned screen 401A, 401B, 401C, and 401D to flicker or by displaying boxes around the suspicious objects in the videos.

In addition, when the suspicious objects are detected in the first CCTV node 300A, the third CCTV node 300C, and the fourth CCTV node 300D, and the first screen 401A, the third screen 401C, and the fourth screen 401D are in the attention mode during output, if the determination module 410 confirms the suspicious object detected in the third CCTV node 300C as the target object or determines the suspicious objects detected in the first CCTV node 300A and the fourth CCTV node 300D receiving propagation of confirmation of the target object as detection errors, the display module 450 switches the first screen 401A and the fourth screen 401D from the attention mode to the normal mode and outputs videos to the display device 401.

The alarm module 440 may compare the movement path of the target object generated by the tracking module 420 with the digital map, and when the target object approaches a preset security zone or dangerous zone, the alarm module 440 may notify the display module 450 so that a screen displaying video including the target object may be switched to a warning mode and displayed. For example, the warning mode may cause the screen to flicker or change colors of the screen.

FIG. 7 is a diagram illustrating a method of detecting an object based on capturing environment information by the plurality of CCTV nodes 300 in the second embodiment.

As illustrated in FIG. 7, each of the plurality of CCTV nodes 300A, 300B, 300C, and 300D collects capturing environment information including an illuminance value of light for the capturing range and a color value of light of surrounding streetlights. For example, each of the CCTV nodes 300A, 300B, 300C, and 300D may measure the illuminance value of light through an illuminance sensor (not illustrated). The CCTV node 300 may measure the color of light through a color sensor (not illustrated). For reference, the color sensor is a device that detects the color of light, that is, the spectral intensity of light energy, which may classify light into three primary colors using a filter and measure the color using a separate light detector, or may divide light passing through a slit into a spectrum using a diffraction grating and detect the spectrum as an electrical signal using a CCD solid-state camera 310. In addition, the color sensor may be a MOS type camera 310 using a CCD or other light receiving elements, and the color may be determined by processing output obtained by converting a wavelength into a voltage.

The CCTV nodes 300A, 300B, 300C, and 300D transmit collected capturing environment information to the supervising server 400, and the supervising server 400 propagates the capturing environment information to other CCTV nodes 300A, 300B, 300C, and 300D.

For example, when the first CCTV node 300A is tracking the target object, the first CCTV node 300A collects capturing environment information and transmits the capturing environment information to the supervising server 400. When the first CCTV node 300A reports departure of the target object being tracked to the supervising server 400, the supervising server 400 propagates the departure of the target object to the second CCTV node 300B to the fourth CCTV node 300D. In this instance, the supervising server 400 further transmits capturing environment information collected by the first CCTV node 300A to the second CCTV node 300B to the fourth CCTV node 300D.

Since the target object has departed from the first CCTV node 300A, the second CCTV node 300B to the fourth CCTV node 300D detect the appearance of the suspicious object, and detect suspicious objects by factoring the capturing environment information collected by the first CCTV node 300A. For example, each of the second CCTV node 300B to the fourth CCTV node 300D detects the suspicious object in corrected video obtained by factoring an illuminance value of light captured by the first CCTV node 300A and a color value of light of the surrounding streetlights in the captured video. For reference, even though the color of the bag, clothes, etc. carried by the target object may be differently expressed depending on the illuminance value of the light or the color of light of the surrounding streetlights, since the object is detected after correcting the video based on the capturing environment information, reliability of object detection may be improved.

Third Embodiment

FIG. 8 is a flowchart illustrating a method of detecting and tracking the object using the edge CCTV according to a third embodiment of the present invention.

The method of the third embodiment includes a step S110 of transmitting characteristic information by the supervising server, a step S120 of reporting, by a CCTV node, appearance and departure of a suspicious object to the supervising server, a step S130 of confirming, by the supervising server, the suspicious object as a target object, and a step S140 of generating, by the supervising server, a movement path of the target object.

The plurality of CCTV nodes is installed to have different capturing ranges in predetermined areas.

The step S110 of transmitting characteristic information by the supervising server includes transmitting, by the supervising server, characteristic information on the target object (specific person) to the plurality of CCTV nodes.

The characteristic information for detecting the target object may include clothing worn by the target object such as a type of top (for example, long sleeves or short sleeves), a type of bottoms (for example, long pants or shorts), a color of the top, and a color of the bottoms, and may be a hair length or a height of the target object, whether the target object is wearing a hat, a tie, glasses, or a mask, or a type (shape) or a color of a bag carried by the target object. For reference, referring to the height of the target object, it is possible to distinguish between an adult or a child using a height estimated from the captured video.

The step S120 of reporting, by the CCTV node, appearance and departure of the suspicious object to the supervising server includes receiving, by the transceiver, the characteristic information for detecting the target object (specific person) from the supervising server.

The transceiver may receive a photographic image or a video image for the target object in which characteristic information for detecting the target object is displayed. For reference, display of the characteristic information in the photographic image or the video image may be directly marked by the administrator or identified by an object detection algorithm (for example, R-CNN, YOLO algorithm, etc.). The photographic image or the video image of the target object may be a scene selected by the administrator from video captured by any one of the CCTV nodes.

In this step, the edge processor of the CCTV node analyzes the video being captured in real time based on the characteristic information received from the supervising server to detect a suspicious object (suspect person). For example, the edge processor considers an object that satisfies a predetermined number (for example, at least 3) of pieces of characteristic information listed above as the suspicious object. The edge processor may use an object detection algorithm (for example, R-CNN, YOLO algorithm, etc.).

When the suspicious object is detected, the edge processor reports appearance of the suspicious object to the supervising server. For example, when the edge processor reports the appearance of the suspicious object to the supervising server, the transceiver may transmit an object detection time in the edge processor to the supervising server. In addition, the transceiver may edit video captured from a predetermined time before a point in time when the suspicious object is detected and transmit the edited video to the supervising server.

When a suspicious object previously recognized within a capturing range or a target object confirmed by the supervising server disappears, the edge processor may report departure of the suspicious object to the supervising server, thereby requesting attention from the administrator.

The supervising server confirms the suspicious object as a target object or determines the suspicious object as a detection error in the video transmitted from the CCTV node, and generates and tracks a movement path of the target object when the suspicious object is confirmed as a target object.

The step S130 of confirming, by the supervising server, the suspicious object as a target object includes receiving, by the determination module of the supervising server, reports of detected suspicious objects from respective CCTV nodes capturing a predetermined area. For example, when there is only one target object, but objects dressed in clothing, having a height, wearing a hat, wearing a tie, wearing glasses, wearing a mask, and carrying a bag similar to those of the target object appear, suspicious objects may be detected from several CCTV nodes.

The supervising server receives all videos of suspicious objects from the plurality of CCTV nodes detecting the suspicious objects.

The determination module of the supervising server analyzes each of the captured videos received from the plurality of CCTV nodes and confirms a suspicious object in video captured by any one of the CCTV nodes as the target object. For example, in FIG. 3, the determination module confirms a suspicious object detected by the third CCTV node as the target object.

The determination module determines, as detection errors, suspicious objects detected by other nodes, that is, the first CCTV node, the second CCTV node, and the fourth CCTV node, other than the suspicious object determined as the target object. For reference, the determination module may select the target object from video including the actual target object by the administrator checking the videos captured by the plurality of CCTV nodes in which the suspicious objects are detected. In addition, the determination module may precisely analyze the videos captured by the plurality of CCTV nodes in which the suspicious objects are detected, compare images of the target object and the suspicious objects, and confirm the target object.

The determination module confirms the suspicious object detected by the third CCTV node as the target object, and transmits the suspicious object to the third CCTV node.

Upon receiving the report of object departure from the third CCTV node, the determination module receives all videos in which the suspicious objects are captured from the first CCTV node to the fourth CCTV node again, and searches for the departing target object. The determination module analyzes each of the received captured videos and confirms a suspicious object in video captured by any one of the CCTV nodes as the target object.

The step S140 of generating, by the supervising server, the movement path of the target object includes generating, by the tracking module of the supervising server, a movement path of the target object based on the CCTV nodes reporting appearance and departure of the target object.

Meanwhile, when any one of the suspicious objects detected by the plurality of CCTV nodes is determined as the target object by the determination module, the propagation module of the supervising server reports appearance of the target object in the third CCTV node to other CCTV nodes around the third CCTV node in which the target object is confirmed, that is, the first CCTV node, the second CCTV node, and the fourth CCTV node.

Other CCTV nodes, which have been notified of the appearance of the target object from the third CCTV node (C of FIG. 3), determine the detected suspicious objects as detection errors even when the suspicious object is detected before the third CCTV node reports the departure of the target object to the supervising server. Alternatively, the first CCTV node, the second CCTV node, and the fourth CCTV node do not detect the suspicious objects until the third CCTV node reports the departure of the target object to the supervising server.

The departure of the target object is reported to the supervising server from the third CCTV node in which the target object is confirmed, the first CCTV node, the second CCTV node, and the fourth CCTV node detect the suspicious objects, and the appearance of the suspicious objects is reported to the supervising server.

Meanwhile, when the determination module of the supervising server confirms a suspicious object detected by one CCTV node (for example, the third CCTV node C) as the target object, the third CCTV node C continuously tracks and captures the confirmed target object.

The edge processor of the third CCTV node that tracks and captures the target object further detects a change in characteristic information of the target object being tracked (captured) among at least one of putting on or taking off glasses, putting on or taking off a hat, changing a color of a top due to taking off clothes, or removing a bag.

When a change occurs in characteristic information of the target object being tracked, the third CCTV node reports the changed characteristic information to the determination module of the supervising server.

The determination module of the supervising server receiving the changed characteristic information from the third CCTV node propagates the changed characteristic information to CCTV nodes around the third CCTV node, that is, the first CCTV node, the third CCTV node, and the fourth CCTV node.

Thereafter, when the departure of the target object is reported to the supervising server from the third CCTV node, the first CCTV node, the second CCTV node, and the fourth CCTV node start to detect suspicious objects, and detect the suspicious objects by factoring the characteristic information changed by the third CCTV node propagated from the supervising server.

The alarm module compares the movement path of the target object generated by the tracking module with the digital map, and transmits a warning message to a preset administrator terminal when the target object approaches a preset security zone or dangerous zone.

Meanwhile, the display module of the supervising server outputs videos transmitted from the CCTV nodes, that is, the first CCTV node to the fourth CCTV node, in real time to a display device divided into a plurality of areas. For reference, the display device may be divided in proportion to the number of CCTV nodes.

The display module may output videos transmitted from the first CCTV node to the fourth CCTV node through the divided screens of the display device selectively in a common mode or an attention mode.

For example, the display module may sequentially arrange and output captured videos of the first CCTV node to the fourth CCTV node on the first screen to the fourth screen, switch the screens, on which captured videos are being output, of the CCTV nodes where the suspicious objects are reported, for example, the first CCTV node, the third CCTV node, and the fourth CCTV node, to the attention mode, and output the videos. The second CCTV node, where a suspicious object is not reported, outputs video to the screen in the normal mode.

Upon outputting videos to the display device in the attention mode, the display module may output the videos by causing borders of the assigned screen to flicker or by displaying boxes around the suspicious objects in the videos.

In addition, when the suspicious objects are detected in the first CCTV node, the third CCTV node, and the fourth CCTV node, and the first screen, the third screen, and the fourth screen are in the attention mode during output, if the determination module confirms the suspicious object detected in the third CCTV node as the target object or determines the suspicious objects detected in the first CCTV node and the fourth CCTV node receiving propagation of confirmation of the target object as detection errors, the display module switches the first screen and the fourth screen from the attention mode to the normal mode and outputs videos to the display device.

The alarm module may compare the movement path of the target object generated by the tracking module with the digital map, and when the target object approaches a preset security zone or dangerous zone, the alarm module may notify the display module so that video including the target object may be displayed by switching to the warning mode.

Meanwhile, each of the plurality of CCTV nodes collects capturing environment information including an illuminance value of light for the capturing range and a color value of light of surrounding streetlights. For example, each of the CCTV nodes may measure the illuminance value of light through an illuminance sensor. The CCTV node may measure the color of light through a color sensor. For reference, the color sensor is a device that detects the color of light, that is, the spectral intensity of light energy, which may classify light into three primary colors using a filter and measure the color using a separate light detector, or may divide light passing through a slit into a spectrum using a diffraction grating and detect the spectrum as an electrical signal using a CCD solid-state camera. In addition, the color sensor may be a MOS type camera using a CCD or other light receiving elements, and the color may be determined by processing output obtained by converting a wavelength into a voltage.

The CCTV nodes transmit collected capturing environment information to the supervising server, and the supervising server propagates the capturing environment information to other CCTV nodes.

For example, when the first CCTV node is tracking the target object, the first CCTV node collects capturing environment information and transmits the capturing environment information to the supervising server. When the first CCTV node reports departure of the target object being tracked to the supervising server, the supervising server propagates the departure of the target object to the second CCTV node to the fourth CCTV node. In this instance, the supervising server further transmits capturing environment information collected by the first CCTV node to the second CCTV node to the fourth CCTV node.

Since the target object has departed from the first CCTV node, the second CCTV node to the fourth CCTV node detect the appearance of the suspicious object, and detect suspicious objects by factoring the capturing environment information collected by the first CCTV node. For example, each of the second CCTV node to the fourth CCTV node detects the suspicious object in corrected video obtained by factoring an illuminance value of light captured by the first CCTV node and a color value of light of the surrounding streetlights in the captured video. For reference, even though the color of the bag, clothes, etc. carried by the target object may be differently expressed depending on the illuminance value of the light or the color of light of the surrounding streetlights, since the object is detected after correcting the video based on the capturing environment information, reliability of object detection may be improved.

Even though the present invention has been described above with reference to several embodiments thereof, it will be understood by those skilled in the art that various modifications and changes may be made to the present invention without departing from the spirit and scope of the present invention as set forth in the claims below.

In addition, the invention related to the method among the embodiments described above may be implemented as a program or as a computer-readable recording medium having the program stored thereon.

That is, the present invention may be implemented as an application, and may be implemented as a software program executed on a mobile terminal such as a smartphone or a tablet executed based on Google's Android or Apple's iOS, or may be implemented as a software program executed on a wearable device such as Google Glass, Apple Watch, Samsung Galaxy Watch, or a smart watch, or may be implemented as a software program executed on a notebook computer or a desktop computer running Microsoft's Windows or Google's Chrome OS.

In addition, partial functions of the above-described device or system may be provided by being included in a computer-readable recording medium by tangibly implementing a program including commands for implementing the functions. The computer-readable recording medium may include program commands, data files, data structures, etc., singly or in combination. Examples of the computer-readable recording medium include magnetic media such as hard disks, floppy disks, and magnetic tapes, optical media such as CD-ROMs and DVDs, magneto-optical media such as floptical disks, and hardware devices specifically configured to store and execute program commands such as ROMs, RAMs, flash memories, and USBs.

The invention claimed is:

1. A system for detecting and tracking an object using an edge CCTV, the system comprising:

a plurality of CCTV nodes each comprising a camera, a transceiver configured to continuously transmit video captured by the camera to a supervising server and receive characteristic information for detecting a target object from the supervising server, and an edge processor configured to analyze the captured video based on the received characteristic information, report appearance of a suspicious object to the supervising server when the suspicious object is detected, and report departure of the suspicious object to the supervising server when the suspicious object disappears after reporting the appearance of the suspicious object; and the supervising server comprising a determination module configured to confirm the suspicious object as the target object or determine the suspicious object as a detection error based on video having the suspicious object whose appearance is reported, and a tracking module configured to generate a movement path of the target object based on CCTV nodes each reporting appearance and departure of the target object.

2. The system according to claim 1, wherein:

the characteristic information comprises at least three of a top color, a bottom color, a hair length, a height, wearing a hat, wearing a tie, wearing glasses, wearing a mask, or carrying bag, and when a detected object corresponds to a preset number or more of pieces of the characteristic information, the edge processor of the CCTV node considers the object as a suspicious object.

3. The system according to claim 2, wherein:

the supervising server further comprises a propagation module configured to report appearance of the target object to other CCTV nodes around a CCTV node reporting the target object when the determination module confirms the suspicious object as the target object, and when the detected object corresponds at least three pieces of the characteristic information, and propagation of appearance of the target object in a surrounding CCTV node is received from the supervising server, the edge processor of the CCTV node determines the object as a detection error.

4. The system according to claim 3, wherein:

when a suspicious object is confirmed as the target object, the determination module of the supervising server further reports confirmation of the target object to a CCTV node reporting the target object, upon occurrence of a change in characteristic information among at least one of putting on or taking off glasses, putting on or taking off a hat, changing a color of a top due to taking off clothes, or removing a bag of the target object being tracked, the edge processor of the CCTV node receiving report of confirmation of the target object further reports the changed characteristic information to the determination module of the supervising server, and the propagation module of the supervising server propagates the reported changed characteristic information to nodes around the CCTV node reporting the change.

5. The system according to claim 1, wherein the supervising server further comprises a display module configured to output videos transmitted from the CCTV nodes to a display device divided into a plurality of areas in real time, display all videos in which suspicious objects are reported by switching from a common mode to an attention mode, and then switch videos determined to have objects of detection errors to the common mode again.

6. The system according to claim 5, wherein the supervising server further comprises an alarm module configured to compare the movement path of the target object with a digital map, and to notify the display module so that video including the target object is displayed in a warning mode or transmit a warning message to a preset administrator terminal when the target object approaches a preset security zone or dangerous zone.

7. The system according to claim 5, wherein:

the CCTV node further provides capturing environment information including an illuminance value of light in a capturing range and a color value of light of surrounding streetlights to surrounding CCTV nodes via the supervising server, and when the target object departs from the CCTV node capturing the target object, each of the surrounding CCTV nodes detects the suspicious object in corrected video factoring the capturing environment information.

8. A method of detecting and tracking an object using an edge CCTV, the method comprising:

transmitting, by a supervising server, characteristic information of a target object to a plurality of CCTV nodes;

receiving, by a transceiver of each of the CCTV nodes, characteristic information for detecting the target object from the supervising server, analyzing, by an edge processor of the CCTV node, captured video based on the received characteristic information to report appearance and departure of a suspicious object to the supervising server when the suspicious object is detected;

receiving, by a determination module of the supervising server, a report of the appearance of the object and video in which the suspicious object is detected from the CCTV node, analyzing the video, and confirming the suspicious object as the target object; and generating, by a tracking module of the supervising server, a movement path of the target object based on CCTV nodes reporting appearance and departure of the target object.

9. The method according to claim 8, wherein:

the characteristic information comprises at least three of a top color, a bottom color, a hair length, a height, wearing a hat, wearing a tie, wearing glasses, wearing a mask, or carrying bag, and when a detected object corresponds to a preset number or more of pieces of the characteristic information, the edge processor of the CCTV node considers the object as a suspicious object.

10. The method according to claim 9, wherein:

the supervising server further comprises a propagation module configured to report appearance of the target object to other CCTV nodes around a CCTV node reporting the target object when the determination module confirms the suspicious object as the target object, and when the detected object corresponds at least three pieces of the characteristic information, and propagation of appearance of the target object in a surrounding CCTV node is received from the supervising server, the edge processor of the CCTV node determines the object as a detection error.

11. The method according to claim 10, wherein:

when a suspicious object is confirmed as the target object, the determination module of the supervising server further reports confirmation of the target object to a CCTV node reporting the target object, upon occurrence of a change in characteristic information among at least one of putting on or taking off glasses, putting on or taking off a hat, changing a color of a top due to taking off clothes, or removing a bag of the target object being tracked, the edge processor of the CCTV node receiving report of confirmation of the target object further reports the changed characteristic information to the determination module of the supervising server, and the propagation module of the supervising server propagates the reported changed characteristic information to nodes around the CCTV node reporting the change.

12. The method according to claim 8, wherein the supervising server further comprises a display module configured to output videos transmitted from the CCTV nodes to a display device divided into a plurality of areas in real time, display all videos in which suspicious objects are reported by switching from a common mode to an attention mode, and then switch videos determined to have objects of detection errors to the common mode again.

13. The method according to claim 12, wherein the supervising server further comprises an alarm module configured to compare the movement path of the target object with a digital map, and to notify the display module so that video including the target object is displayed in a warning mode or transmit a warning message to a preset administrator terminal when the target object approaches a preset security zone or dangerous zone.

14. The method according to claim 12, wherein:

the CCTV node further provides capturing environment information including an illuminance value of light in a capturing range and a color value of light of surrounding streetlights to surrounding CCTV nodes via the supervising server, and when the target object departs from the CCTV node capturing the target object, each of the surrounding CCTV nodes detects the suspicious object in corrected video factoring the capturing environment information.

* * * * *